United States Patent [19]

Batzer et al.

[11] Patent Number: 4,856,030

[45] Date of Patent: Aug. 8, 1989

[54] APPARATUS AND METHODS OF LOCKING A RECEIVING MODEM TO A TRANSMITTING MODEM EMPLOYING A BURST SIGNAL

[75] Inventors: John L. Batzer, New Providence, N.J.; Kristine N. Kneib, La Jolla, Calif.

[73] Assignee: ITT Defense Communications, Nutley, N.J.

[21] Appl. No.: 221,833

[22] Filed: Jul. 20, 1988

[51] Int. Cl.$^4$ .............................................. H04B 7/00
[52] U.S. Cl. ...................................... 375/106; 375/8; 364/724.1
[58] Field of Search .................. 329/50, 104; 328/155; 375/12, 14, 15, 97, 106, 110, 7, 8; 364/724.10, 724.16, 724.20; 370/104

[56] References Cited

U.S. PATENT DOCUMENTS

| | | | |
|---|---|---|---|
| 3,769,587 | 10/1973 | Matsuo et al. | 370/104 |
| 4,562,582 | 12/1985 | Tokura et al. | 375/110 |
| 4,722,093 | 1/1988 | Tejima | 329/104 |
| 4,803,438 | 2/1989 | Mizoguchi | 329/50 |

Primary Examiner—Benedict V. Safourek
Attorney, Agent, or Firm—Thomas N. Twomey; Mary C. Werner

[57] ABSTRACT

A receiving modem is locked to a transmitting modem by employing a burst data and clock signal having an effective data rate compatible with the data rate of a receiving data set. The receive modem processes a transmitted analog signal as sent by the transmitting modem to provide a digital signal which is applied to an interpolation filter. The filter provides at an output a retimed signal. This retimed signal is monitored by a baud sync measurement circuit which detects the drift of baud transitions in the retimed interpolated signal to provide an output phase error signal. This phase error signal is used to control the filter coefficients of the interpolation filter for the next data block. In this manner the interpolation filter provides a newly retimed digital output signal according to the detected phase error. The output signal is demodulated and converted to a burst data and a burst clock signal for application to a receiving data set. The burst signals allow the data set to lock to the transmitted signal.

24 Claims, 12 Drawing Sheets

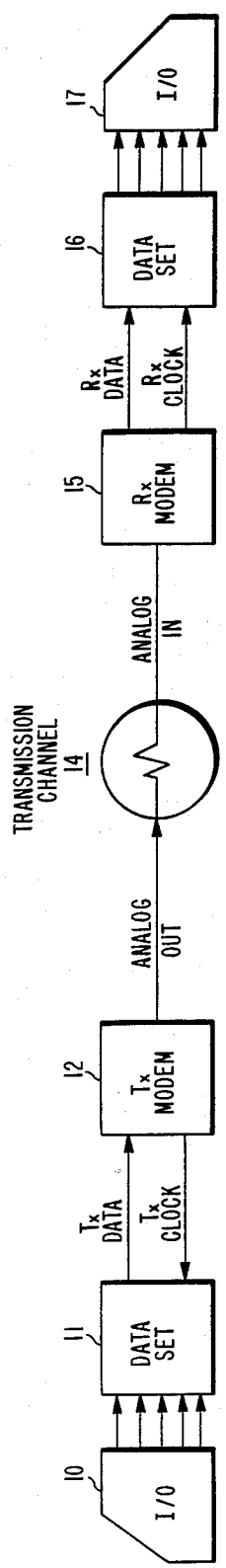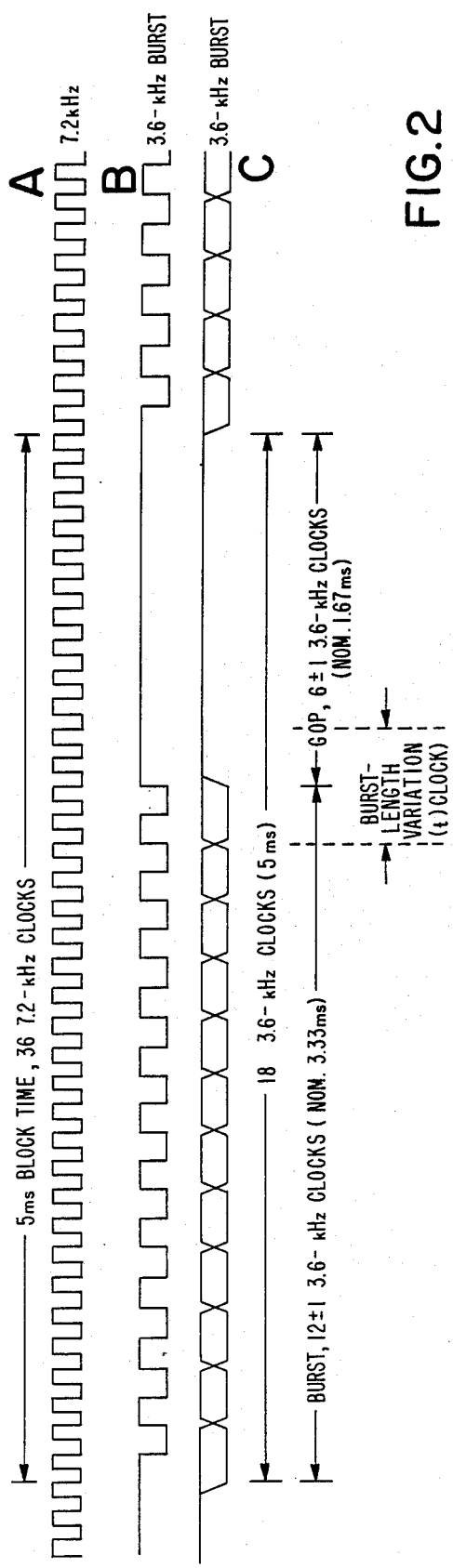

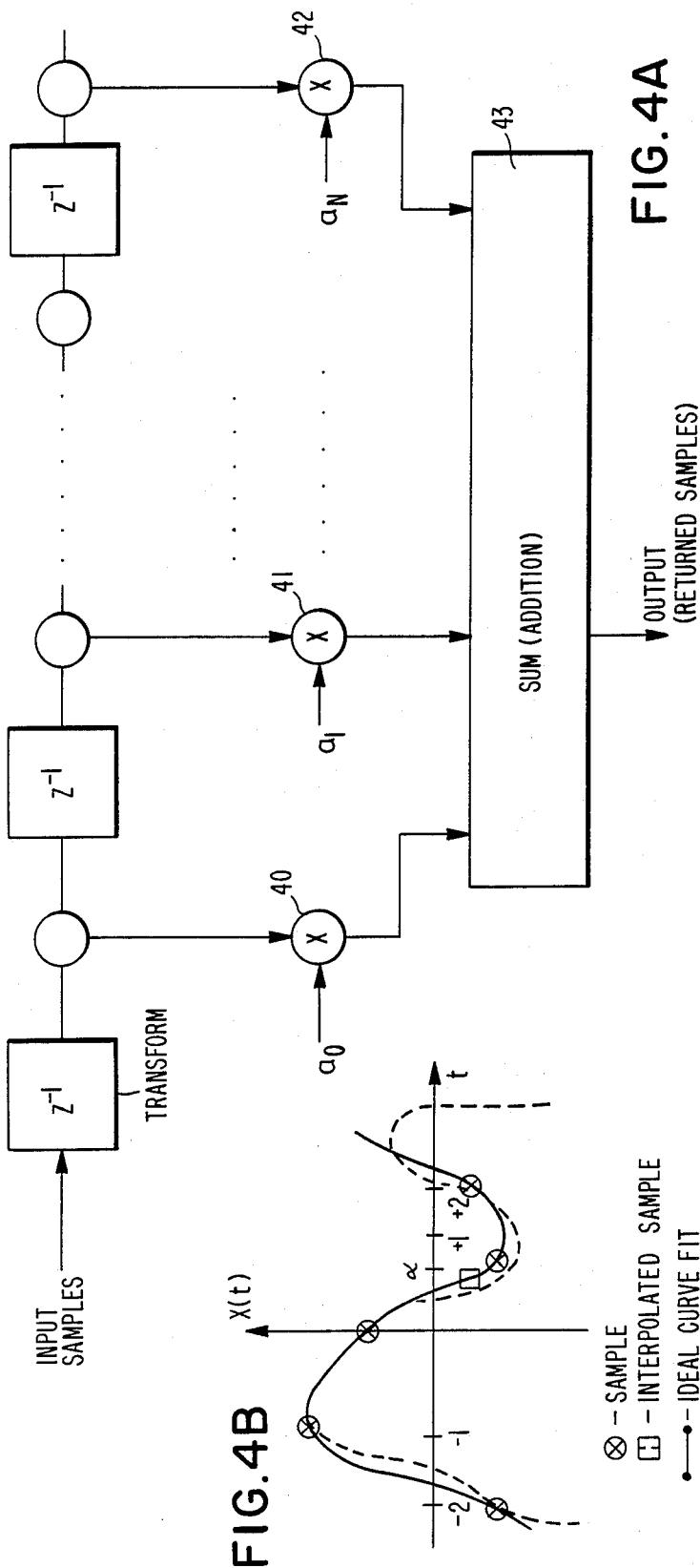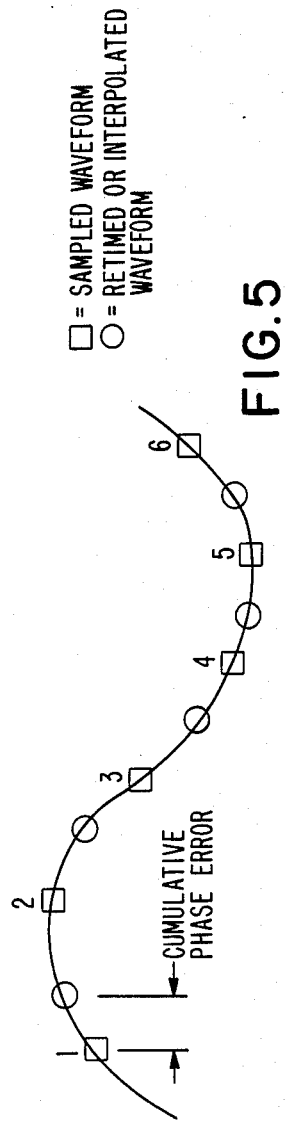

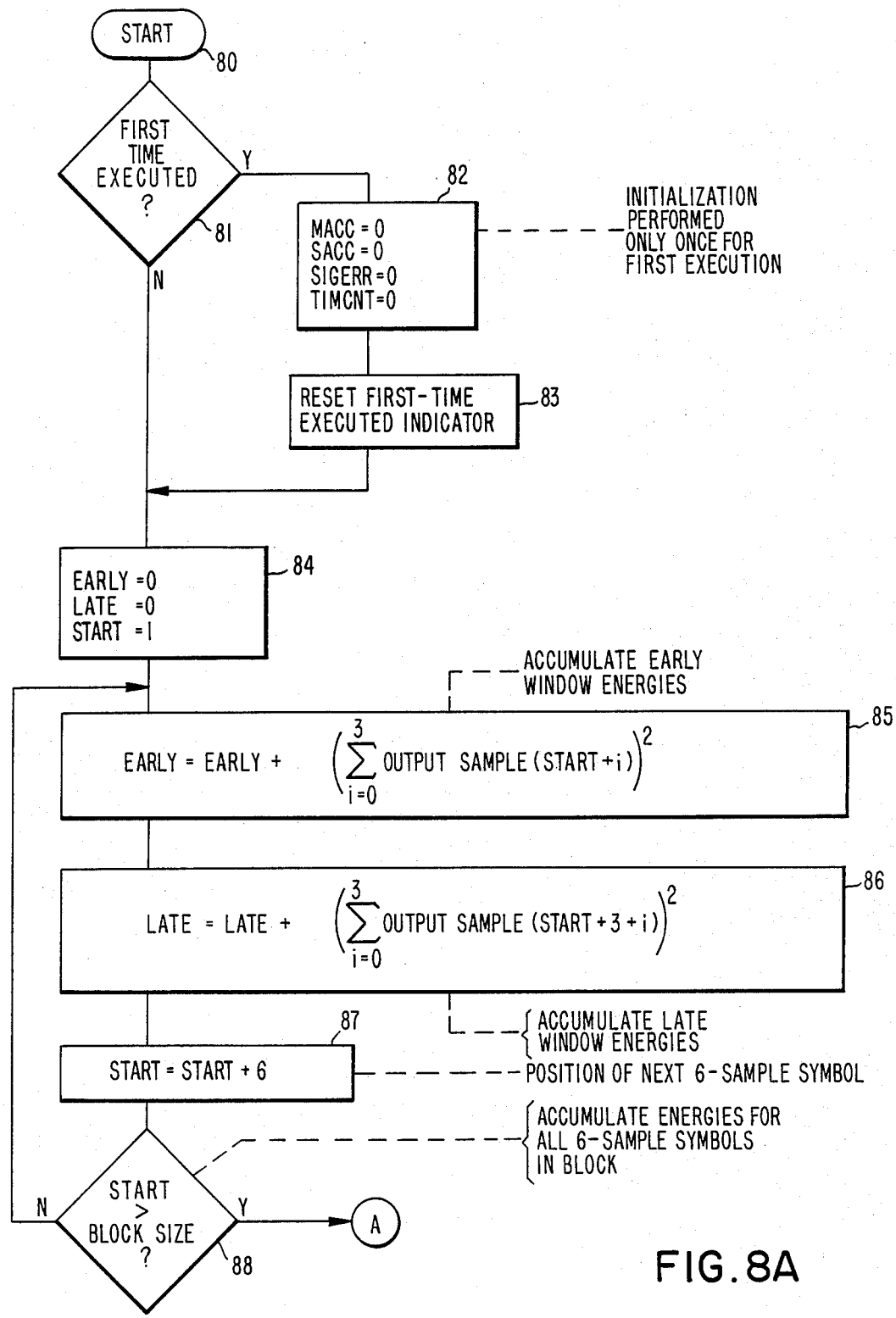

APPARATUS AND METHODS OF LOCKING A RECEIVING MODEM TO A TRANSMITTING MODEM EMPLOYING A BURST SIGNAL

FIELD OF THE INVENTION

This invention relates to apparatus for synchronizing or locking a receiving modem to a transmitting modem and more particularly to apparatus for utilizing a burst signal for assuring the synchronization of a receiving modem and an associated data set to a transmitting modem.

BACKGROUND OF THE INVENTION

As one can readily ascertain, time and timing are extremely important factors in any digital transmission system. It is apparent that when signals are generated by a transmitter and received by a receiver the speed of the receiver must be the same or very close to that of the transmitter. In this manner it follows that whenever a receiver accumulates a timing error, it will process data incorrectly.

Thus, as one can ascertain, all currently used data transmission systems are synchronized in some manner. One prior art technique is referred to as start/stop or asynchronous operation. With such systems a character begins with mark-to-space transition at the beginning of the start space. Then a number of unit intervals later the timing causes the receiving device to sample the first information element which simply is a mark or space decision. The receiver continues to sample at one-bit intervals until the stop mark is received. In start/stop systems the last information bit is the most susceptible to cumulative timing errors. Such systems have other problems regarding the mutilation of the start element and so on. Synchronized data systems do not have start/stop elements but consist of a continuous stream of information elements or bits.

As such, such systems have timing generators or clocks to maintain stability. The transmitting device and its companion receiver at the far end of the circuit must maintain a timed system. In normal practice the transmitter is the master clock of the system. The receiver also has a clock and in every case the receiver's clock is corrected by some means to its transmitter's master clock equivalent at the far end.

As such, there are many techniques for providing such correction. The prior art, for example, utilized what is referred to as a "rubber" clock. Such "rubber" clocks or programmable interval timers are available at the receiver which essentially has logic circuitry for deriving a receiving clock from the transmitted waveform. The receiving circuitry uses the derived clock to synchronize its sampling clock with the clock derived from the transmitted waveform.

This in turn assures that the receiver will sample at the correct intervals to thereby regenerate the transmitted data. In any event, the use of programmable interval timers or "rubber" clocks requires a great deal of additional hardware and further makes the circuit in the receiver extremely complicated. As indicated, the most prevalent system in use today is one that uses transition timing where the receiving device is automatically adjusted to the signaling rate of the transmitter by sampling the transitions of the incoming pulses. This type of timing offers advantages in regard to automatic compensation for variations in propagation time. With this type of synchronization the receiver determines the average repetition rate and phase of the incoming signal transitions and adjusts its own clock accordingly.

As one can understand in digital transmission, the concept of a transition is very important. The transition is what really carries the information. In binary systems the space-to-mark and mark-to-space transitions as positioned in a time reference contain the information. In sophisticated systems, decision circuitry generates and retimes the pulses on the occurrence of a transition. Unlike decision circuits, timing circuits that reshape the pulse when a transition takes place must have a memory for the case when a long series of marks or spaces is received.

Hence, modem internal timing systems tend to have a long term stability of $1 \times 10^{-8}$ or better at both the transmitter and receiver. At a data rate of 2,400 bps before a significant timing error can build up, the accumulated time difference between the transmitter and receiver must exceed $2 \times 10^{-4}$ seconds. Whenever the circuit of a synchronized transmitter or receiver is shut down, the clocks must differ at least by $2 \times 10^{-4}$ seconds before significant errors take place. This essentially means that the leading edge of the receiver clock equivalent timing pulse is $2 \times 10^{-4}$ in advance or retarded from the leading edge of the pulse received from the distance end.

Thus, in such systems an idling signal is sometimes sent to synchronize data circuits during periods of no traffic to maintain the timing. Such systems utilize high stability clock circuits which require resynchronization over prolonged intervals. Thus, as indicated, the above types of prior art systems utilize a great deal of additional hardware that is necessary in order to synchronize the receiving clock to the transmitting clock. This additional hardware increases the cost of such systems and further reduces the reliability.

It is, therefore, an object of the present invention to provide an improved locking system or synchronizing system for locking a receiving modem to a transmitting modem without the use of additional hardware.

The apparatus and method to be described employs a modem phase locking technique which technique employs a burst signal for such synchronization and which signal avoids complicated circuitry as implemented by the prior art.

BRIEF DESCRIPTION OF THE PREFERRED EMBODIMENT

Apparatus for locking a receiving modem to a remote transmitting modem, said receiving modem communicating with said transmitting modem over a communications channel of a given bandwidth for accommodating a given data rate with said transmitting modem providing an analog signal for transmission, which signal is generated by said transmitting modem using a clock for sampling digital data from a data set and converting said data according to said clock into an analog signal, comprising receiving means for receiving said analog signal and for converting said signal to a digital signal, an interpolation filter means responsive to said digital signal for providing a retimed digital output signal, said interpolation filter means having coefficient input means to enable said retimed signal to vary according to selected coefficients, means coupled to the output of said interpolation filter means and responsive to said retimed signal to provide an error signal at an output indicative of differences in bit positions of said retimed signal, means for applying said error signal to said coefficient input means for varying said retimed signal according to said error signal to lock said retimed signal to said transmitted analog

BRIEF DESCRIPTION OF THE FIGURES

FIG. 1 is a simple block diagram showing a data communication system according to this invention.

FIGS. 2A, B and C depict a series of timing diagrams useful in explaining the operation of this invention.

FIG. 4A is a block diagram of an interpolation filter according to this invention.

FIG. 4B is a diagram showing the transfer function of the interpolation filter according to this FIG. 5 is a waveform depicting sampling between bits of a sampled waveform and an interpolated waveform.

FIGS. 8A-8C show flow charts describing in detail the operation of the baud sync measurement circuit.

DETAILED DESCRIPTION OF THE FIGURES

Figure 3:
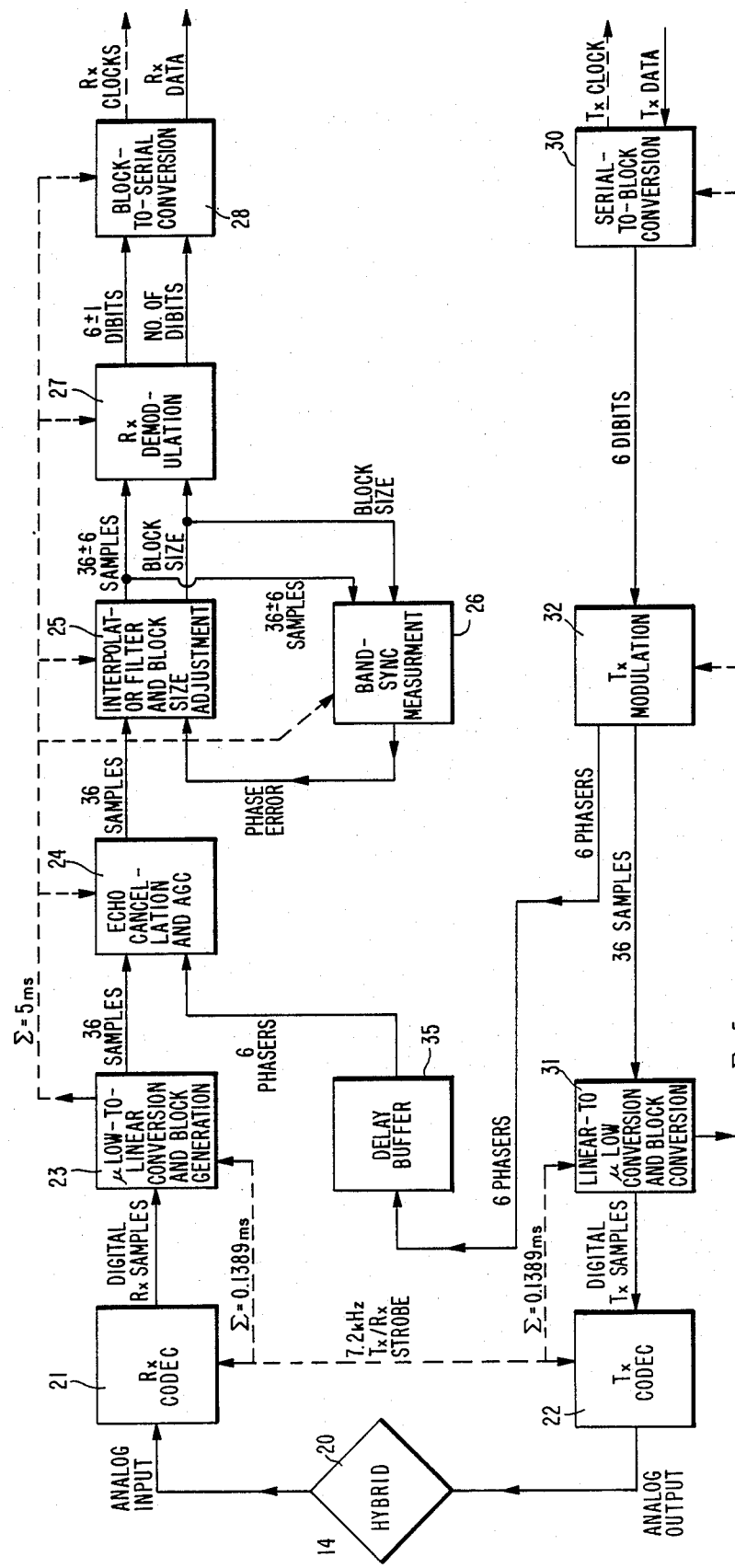
FIG. 3 is a detailed block diagram of a modem according to this invention.

Referring to FIG. 1, there is shown a typical data communication system which essentially includes an input-output (I/O) device 10. The I/O 10 is coupled to a data set 11 which essentially transmits digital data to a transmit modem 12. The modem 12 receives the data via the data line and synchronizes the data set 11 by means of a clock which is the system's reference clock. The modem 12 is a transmitting modem and essentially the word modem is an acronym for Modulator Demodulator. The function of the modem 12 is to convert the digital data received from the data set 11 to an analog signal for transmission over a typical transmission channel 14 which may for example be a telephone line.

At the far end of the telephone line, there is a receive modem 15 which receives the transmitted data and converts the data into digital data to be applied as a data input to a receiver data set 16. The receiving modem also supplies a clock and digital data to the data set 16 which data set operates on the digital data for converting the information so it is received by an I/O 14 which device 14 is compatible with device 10 in the transmitting modem. It is noted that the system of FIG. 1 is a general example of a data communication system. It is well known that the term data set is sometimes referred to as data processing terminal equipment (DPTE). See a text entitled "Telecommunications System Engineering" by Robert L. Freeman, (1980), John Wiley & Sons, Chapters 9 and 10. The input-output devices 10 and 11 are generally referred to as data input-output devices (I/O) and for example such input devices may handle paper tape, punched cards, magnetic tapes, disks, drums, visual displays, and printed page copies. Such input devices may include keyboard sending units, card readers, paper and magnetic tape readers, optical character readers and a host of other devices. Output devices include printers, card punches, paper and magnetic recorders, visual displays and so on.

One will immediately understand that one can employ many different input output devices in conjunction with a data set as 11. In a similar manner one can employ many different types of devices as 17 in conjunction with a data set. As one can understand from FIG. 1 and from the above description, the transmitting modem 12 takes a digital signal, converts it to an analog signal which is transmitted along a conventional transmission channel 14 which in this case is a telephone line. The transmitting modem includes a modulator for converting the digital data signals into a suitable modulated signal such as a PCM signal (pulse code modulation), a PSK (phase shift keying) signal, QPSK signal (quadrature phase shift keying) and so on. A typical data rate which is transmitted over such a telephone line may for example be 2,400 bits per second (2,400 bps). At the other end of the telephone line 14 or transmission channel, the receive modem 15 receives the transmitted analog signal and converts the signal into digital data. This digital data is sent to the data set 16 with a clock signal on separate lines as provided by the receiving modem. The data and the clock signal enable the data set to regenerate the transmitted information. As one will understand, if the receiving clock at the receive modem 15 is not locked to the transmitting clock as derived from the transmitting modem 12, data which is regenerated by the data set 16 will not be in synchronism with the transmitted data. Hence the received data will not correspond to the transmitted data. Thus, as one can understand and as indicated in the Background of the Invention, there is a requirement that the clock of the receiving modem 15 be locked to the clock of the transmitting modem 12.

As indicated, the prior art provided many techniques for doing this which included additional circuitry. The present invention, as will be explained, utilizes a burst technique which enables the receiving modem 15 to lock to the transmitting modem 12 to enable the receiving data set 16 to reproduce the transmitted data. The technique to be described eliminates the need for synchronizing the sampling clock of the receiving modem to the transmitted signal and therefore substantially reduces the amount of circuitry necessary to perform such synchronization.

Referring to FIG. 2, there is shown a series of timing diagrams which depict the various clocks and data signals which are used and are necessary to explain the operation of the system.

Before describing the operation of the system, it is indicated that the system to be described utilizes a transmission channel 14 of FIG. 1 as a telephone line. In this manner the bit rate is 2,400 bits per second which is conveniently transmitted over the telephone line. It is further understood that different data rates can be employed wherein the above example is indicative of one particular system employing the data rate of 2,400 bits per second.

FIG. 2A shows a receive and transmitting sampling clock which is a 7.2 KHZ clock. As one can ascertain, the clock rate of 7.2 KHZ is three times 2.4 KHZ which is the data transmission rate. The higher sampling rate is selected according to the conventional Nyquist criterion. As shown in FIG. 2A, a block or frame time consists of 5 milliseconds which essentially includes 36 clock pulses at the 7.2 KHZ rate.

FIG. 2B shows the receiver data clock which consists of pulses at a 3.6 KHZ rate indicative of the burst signal followed by a burst gap. The burst gap is devoid of pulses.

FIG. 2C shows the data output from the receive modem which is shown for the block time of FIG. 2A. As one will understand, the total burst signal encompasses eighteen 3.6 KHZ clocks for the 5 millisecond period. In any event, the burst pulse signal plus the gap is always equal to eighteen clocks at 3.6 KHZ. As will be explained, the burst consists of 12 cycles of 3.2 KHZ clocks which can vary ±1 cycle. Because the burst signal can vary ±1 cycle then the gap can vary between 6±1 cycle.

As will be explained, the burst time plus the gap interval is always equal to 18 clock cycles. Therefore, if one transmitted 12 data bits as shown in FIG. 2C, the gap would be 6 bits providing a total sum 18. Due to the synchronization technique to be described, one may transmit 13 data bits which will therefore provide a gap width of 5 again totaling 18 or one may transmit 11 data bits thus providing a gap width of 7 again totaling 18.

In this manner, by use of the burst signal, one can synchronize the receiving modem to the transmitting modem, as will be explained. Furthermore, the sychronization provided by the above-noted burst technique eliminates the need for synchronizing the sampling clock of the receiving modem to the clock of the transmitting modem as utilizing prior art locking techniques such as a "rubber" clock or a programmed interval timer. It is noted that in FIG. 2 the burst rate was selected at 3.6 KHZ which essentially is the sampling rate (7.2 KHZ) divided by 2. This is selected so that the burst frequency is higher than the data rate of 2.4 KHZ. It is, of course, understood as indicated above that if different data rates are employed then different burst frequencies can be employed.

In any event, as indicated and as shown in FIG. 2, it is important to note that the burst data clocks plus the gap is always equal to 18 clocks at 3.2 KHZ rate during a 5 millisecond frame or block time. The effective rate of the clock signal (FIG. 2B) and the data signal (FIG. 2C) is 2,400 HZ to enable a conventional data set as 16 to synchronize to the 3.6 KHZ burst and data as the effective 2.4 KHZ rate will operate the data set 16 as if there was a continuous 2.4 KHZ data and clock signal.

Referring to FIG. 3, there is shown a systems level block diagram of a typical modem subsystem. It is noted that the modem subsystem as shown in FIG. 3 is employed for a particular type of system and the burst locking technique which is the subject matter of this invention can be utilized in any other typical modem subsystem.

As shown in FIG. 3, the modem consists of a receiving path and a transmitting path at each location. The modem is connected or coupled to a telephone line 14 which interfaces with a hybrid 20. The hybrid 20 receives a transmitted signal from the Codec 22 indicative of an analog output for transmission on the telephone line 14. This signal may be a phase shift keyed signal or a QPSK modulated signal. A QPSK signal includes 1,200 symbols per second with each symbol being two bits. This is a well known technique. The hybrid 20 also serves to couple an analog input signal to the receive Codec 21. The word Codec stands for Coder-Decoder and operates to convert an analog signal to a digital signal in the case of the receive Codec 21 or to convert a digital signal to an analog signal in case of the transmit Codec 22. The functions of Codecs are well known and many examples exist in the prior art. As shown, the input to the modem subsystem include the two-wire telephone line 14. Once per output cycle of the 7.2 KHZ clock signal a receive transmit sample is read from and a transmit sample is written into the receive and transmit Codecs 21 and 22.

This clock (FIG. 2A) is used to provide sampling strobes for both the transmit and receive sides of the Codec. This invention is primarily concerned with the receive modem whereby the receive modem will operate to synchronize the data set 16 to the transmitted signal as will be explained. As one can understand, the Codec 21 includes an analog-to-digital converter which operates to sample the analog signal at the 7.2 KHZ rate. The received digital samples generated by the Codec 21 are 8 bits in length which are semilogorithmically coded. These samples are converted to 13 bit linear samples and subsequently grouped into 36 sample blocks. It is understood that the size of the block which is 36 samples corresponds closely to desired system operating characteristics and as shown in FIG. 2A a block or a frame would constitute 36 samples of the 7.2 KHZ clock. The output from the Codec 21 consists of the digital samples which as indicated are stored in the Codec 21 and outputed as 8 bit samples. These are directed to a module 23 which is MU Law to linear converter and block generator. Essentially, the module 23 contains a memory or table lookup and converts the bits into 13 bit linear samples which are grouped into 36 sample blocks. As shown, the output of module 23 consists of 36 samples or one block for each 36 samples.

Techniques for doing this are well known in the art. Once per 5 millisecond block time 36 received samples are coupled to the input of the module 24 labeled echo cancellation and AGC. Also inputted into this module are 6 symbol phasors which correspond to the 36 transmit samples as transmitted when the above-mentioned 36 received samples were received from the Codec. These six phasors are applied via a delay buffer 35 to the input of the echo cancellation and AGC circuit 24. The echo cancellation and AGC module 24 removes the transmit echo and adjusts the time average energy of the result to a predetermined reference level. The operation of an echo cancellation and AGC module as 24 is also well known.

The output of the echo cancellation and AGC module 24 contains 36 samples which are applied as an input to an interpolation filter and block size adjustment module 25. The interpolation filter has two outputs designated as a sample output and a block size output. These two outputs are coupled to a baud sync measurement circuit 26 which produces a phase error for application in a feedback loop to the interpolation filter and block size adjuster 25. The error signal from module 26 is used to control the filter coefficients of the interpolation filter 25. The interpolation filter 25 and the baud sync measurement module 26 adjust the block sizes such that the symbol rate matches that of the far end terminal. This is exactly the synchronizing scheme to be described in greater detail.

The outputs from the interpolation filter are coupled to module 27 which is indicated as a receive demodulation module. The module 27 demodulates the digitized phase shift keyed signal with a 36 complex sample adaptive equalizer and produces a vector of 6±1 dibits as an output. The block-to-serial conversion module 28 converts the 6±1 dibits to 12±2 bits per block. The module 28 then time averages the 12±1 bits per block then serializes and outputs the bits to the data set 16. Thus, the output of the block-to-serial conversion module 26 is indicated as RX clocks and RX data which are shown respectively in FIGS. 2B and 2C. The data set 16 receives the burst signals as indicated in FIGS. 2B and 2C from module 28.

As will be further described, the interpolation filter 15 retimes the sampled waveform so that a symbol period at the receiver is locked to the transmitter. A symbol size is six samples at the 7.2 KHZ rate. In a typical system the bit rate which is received over the telephone line is 2,400 bits per second and the system employs a QPSK modulation technique wherein 2 bits are transmitted for each symbol or 1,200 symbols are transmitted per second. The QPSK modulation technique as indicated above is a well known technique which is employed in many modems.

As shown in FIG. 3, the interpolator or interpolation filter 25 is used to retime the transmitted clock. The interpolator transforms a fixed length set of symbols into a variable length set of symbols at its output and conveys the number of signal samples to the baud sync measurement circuit 26 while informing the circuit of the particular block size. As one can ascertain, the interpolation filter can transmit 30, 36 or 42 samples which are sent to the baud sync measurement circuit 26. The number of samples transmitted is referred to as the block size. The baud sync measurement circuit 26 determines the symbol frequency and controls the coefficients for the interpolation filter by generating a phase error signal.

The interpolator 25 is basically a digital filter which is a circuit or computer program that is linear and time invariant and operates on discrete time signals. Digital filters are well known and are fabricated with conventional digital hardware such as adders, multipliers and shift registers for delay. Digital filters can also be implemented as computer programs for use with suitable general purpose or special purpose computers. The basic analysis tool for digital filters is the Z transform which is described and shown in many references.

The digital filter as employed for interpolator 25 is an FIR filter. The term FIR stands for finite impulse response. The filter as will be seen is a multi-ordered filter and, as indicated, its employing circuit 25 transforms a fixed length set of symbols into a variable length set of symbols to enable synchronization between the transmitted and receive clocks. The baud sync measurement circuit 26 receives the retimed samples from the interpolator filter 25 and receives information regarding the block size. The output from the baud sync measurement circuit 26 is indicative of the phase error of the retimed samples with respect to reference samples and operates to control the coefficients of the interpolation filter as will be explained.

The block size as indicated is the number of sets of six samples and that number corresponds to the block size which is responded to by the interpolation filter 25. The outputs of the interpolation filter 25 are coupled to the demodulation circuit 27 which produces one dibit for every six samples. Thus, the output of the demodulator 27 produces 6±1 dibits which are coupled to the block-to-serial conversion module 28 with information indicative of the number of dibits. The block-to-serial conversion module 28 then converts the output of the demodulator 27 to the waveforms shown in FIGS. 2B and 2C. It is indicated herein that techniques for performing such conversions as performed in module 28 are well known and there are many well known circuit configurations which will produce the two waveforms shown in FIGS. 2B and 2C for applying the same to a typical data set. The block-to-serial conversion module 28 is essentially a parallel-to-serial converter which stores the dibits in a register of a length according to the number of dibits. The stored bits are then shifted out at the 3.6 KHZ rate with the proper width to always equal 18 clocks according to the waveform of FIGS. 2B and 2C. The flow chart in FIG. 9 describes the operation of the block-to-serial module 28.

Figure 9A:
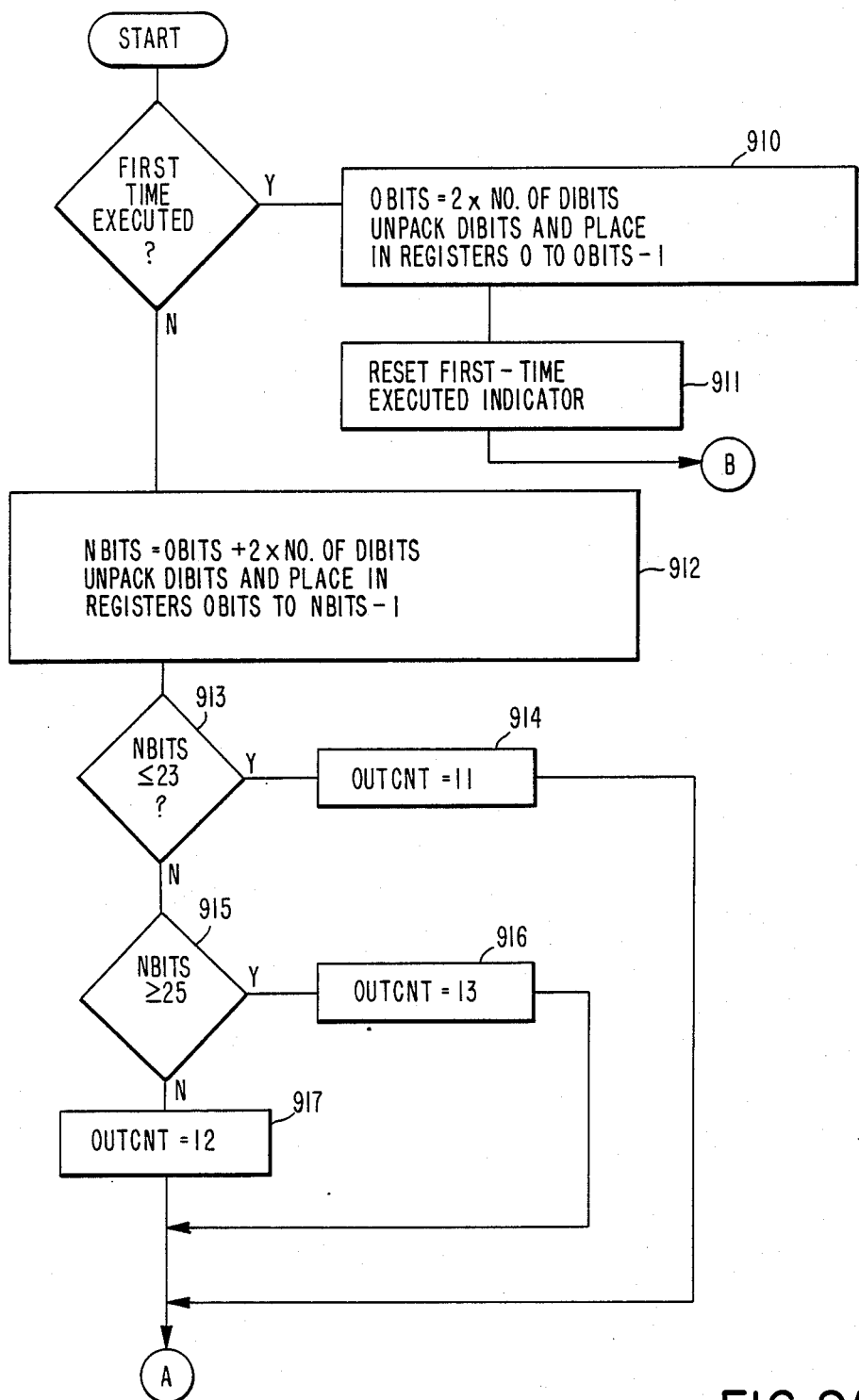
FIGS. 9A-9B show flow charts describing the operation of the block-to-serial conversion circuit.
Figure 9B:
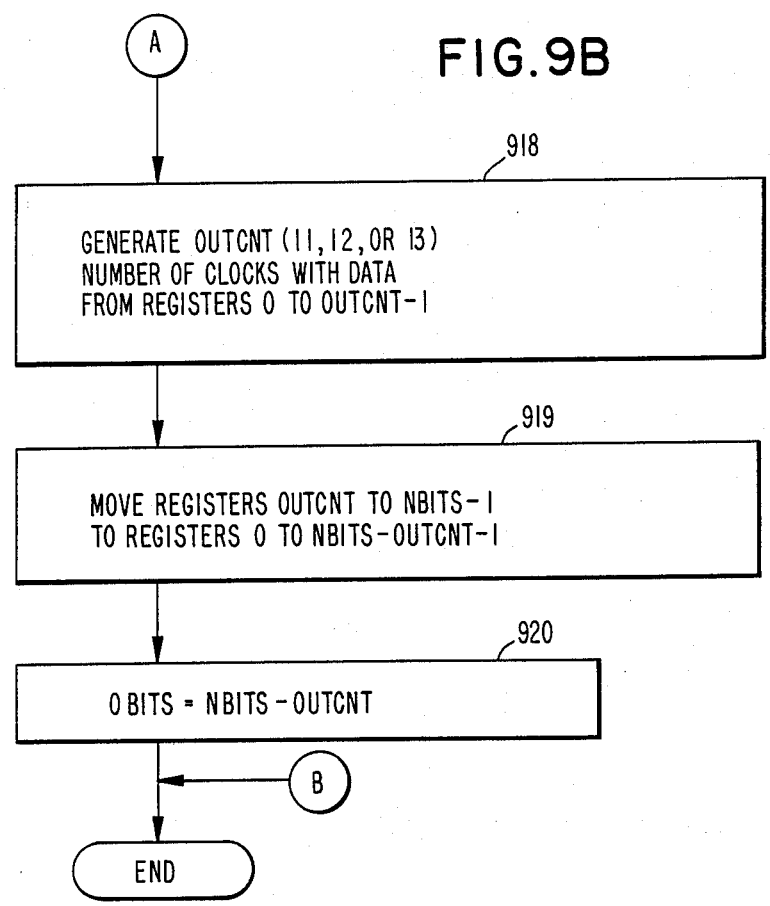

Referring to FIG. 9, there is shown the operation of the block-to-serial conversion module 28 of FIG. 3. The module essentially contains a plurality of registers, or register buffer. For the first block of data output from module 27 of FIG. 3, module 910 forms the value OBITS as that number of bits equal to twice the number of dibits output from module 27, then unpacks these dibits and places the resulting bits into positions 0 to OBITS-1 of the register buffer. On second and subsequent blocks of output from module 27, modules 912 to 920 operate to generate 11, 12, or 13 clocks with data, as follows. Module 912 forms the value NBITS as OBITS plus twice the number of dibits output from module 27, then unpacks these dibits and places the resulting bits into positions OBITS to NBITS-1 of the register buffer. Modules 913 to 917 determine the output count, OUTCNT, number of clocks to generate as being either 11, 12, or 13. Module 918 generates these OUTCNT number of clocks with data from register positions to 0 to OUTCNT-1. Module 919 moves the contents of the register buffer so that the first bit of the next set of bits to be output is placed in position 0 of the register buffer. Finally, module 920 determines the number of bits yet to be output from the register buffer as NBITS less the output count (OUTCNT). Thus, one will understand from FIGS. 9A and 9B how the operation of the block-to-serial module 28 is implemented. As one can ascertain, the output of the block-to-serial converter assures the proper rate signal as containing 11, 12, or 13 clocks within the 5 millisecond frame as shown in FIGS. 2B and 2C.

Again referring to FIG. 3, it is indicated that the block-to-serial conversion module 28 will initially not provide the output clock signal to the data set. The interpolation filter 25 and the baud sync measurement module 26 pass data through unaltered until the AGC function module 24 detects signal energy and the demodulation module 27 detects a carrier at which point in time the interpolation filter 25 and the baud sync measurement circuit 26 will be activated. The block-to-serial conversion module 28 will not produce clock outputs until after the appropriate start of a message sequence is detected by the demodulator module 27.

Shut down may be instigated by the loss of signal energy which is detected by the AGC module 24, loss of carrier which is detected by the demodulation module 27 or by a suitable command from terminal control. In the transmit path the serial-to-block converter 30 will initially not produce transmit clock outputs to the data set (as 11 of FIG. 1). The data buffers which are included in the linear to MU Law conversion and block conversion module 31 are loaded with one or more blocks of binary zero linear samples and the TX modulation module 32 expels 36 sample blocks of binary zeros and phasors of zero magnitude until activated with a suitable input. The serial-to-block conversion module 30 accepts inputs from a source other than the data set during formulation of the message header and contains sufficient buffer capacity to switch to the data set input source while maintaining continuity of data flow after providing its initial output.

In a similar manner shut down on the transmit path is initiated by a command from terminal control after which time the serial-to-block conversion module 30 will stop sending clock outputs to the data set and a TX modulation module 32 will revert to generating binary zeros to squelch the analog output. These system functions as briefly described above should enable one to more fully understand the system environment. Thus, briefly referring to the modem transmitting section, operation is as follows. Serial data are inputted from the data set at an average rate of 2,400 bps.

This average rate is indicative of the 3,600 HZ burst signal as for example shown in FIG. 2C. The bits in the 5 millisecond block time are grouped into blocks of 6 dibits each. This conversion is performed in module 30 designated as serial-to-block conversion. The TX modulation module 32 converts each dibit into a phase shift of 45, 135, 315 or 225 degrees corresponding to a dibit value of 00, 01, 10, or 11 respectively. These phase shifts are added to an 1,800 HZ rotating phasor once per baud time to produce six phasor outputs per block time. These phasors are stored in the delay buffer 25 for subsequent processing by the echo cancellation module 24 in the receive path. Each of the six phasors is converted to an 18 sample sinusoidal symbol, window weighted with a sine (X)/X function and overlaid on its predecessor with a six sample intersymbol time displacement.

This TX modulation technique is widely utilized in many modems. The linear to MU Law conversion and block conversion modules 31 semilogorithmically encodes the sample for subsequent output to the TX Codec 22. Hence, they are converted to an analog signal as a QPSK modulated signal and applied to the telephone line 14 via the hybrid 20.

As indicated above, the TX and RX samples are the input to and the output from the Codec 21 and 22 with a common strobe from a 7200 HZ clock (FIG. 2A). The transmitter clock of the far end terminal which provides the analog input to the RX Codec 21 is not precisely aligned with and will drift with respect to the receiving clock which is employed for example in the receiving section.

As shown in FIG. 3, the input to the baud sync measurement circuit 26 is a block of either 30, 36 or 42 samples. The baud sync measurement module 26 employs windowed filters which operate to detect the positions of the baud transitions with respect to baud transitions which have been retimed. The phase error which is the output of the baud sync measurement module represents an uncorrected timing error. This phase error is fed back into the interpolation filter 25 to change the filter coefficients and, subsequently, to reduce the uncorrected timing error for next block processing. As illustrated in the flow diagram, FIG. 7, the interpolation filter generates a fractional 7200-HZ clock-period delay to the input samples to produce the output samples, said fraction represented by an integer numerator ranging from 0 to 63 and a denominator of 64, said numerator corresponding to a particular set of 64 sets of interpolator coefficients.

Figure 7A:
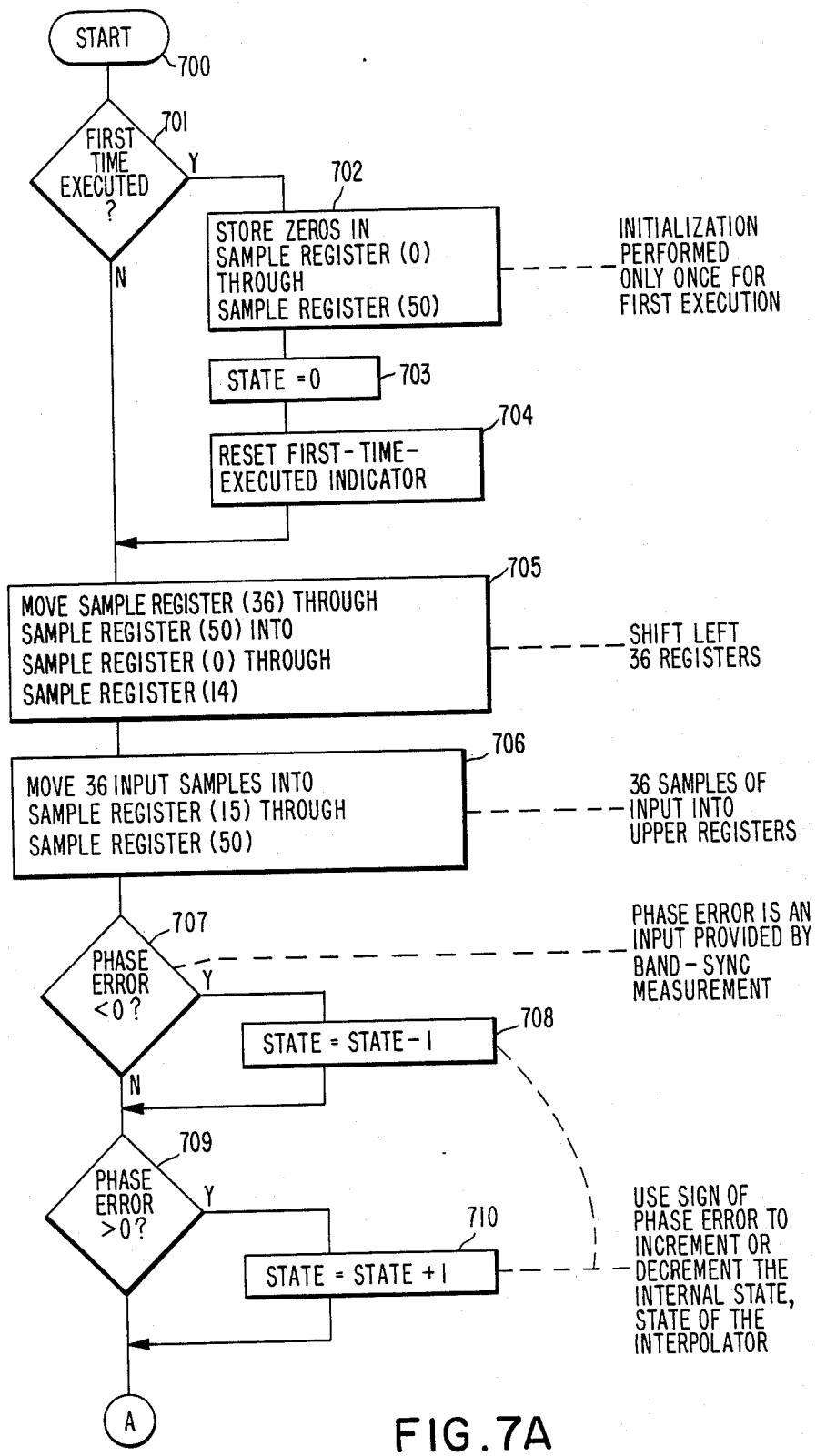
FIGS. 7A-7C show flow charts describing in detail the operation of the interpolator filter.
Figure 7B:
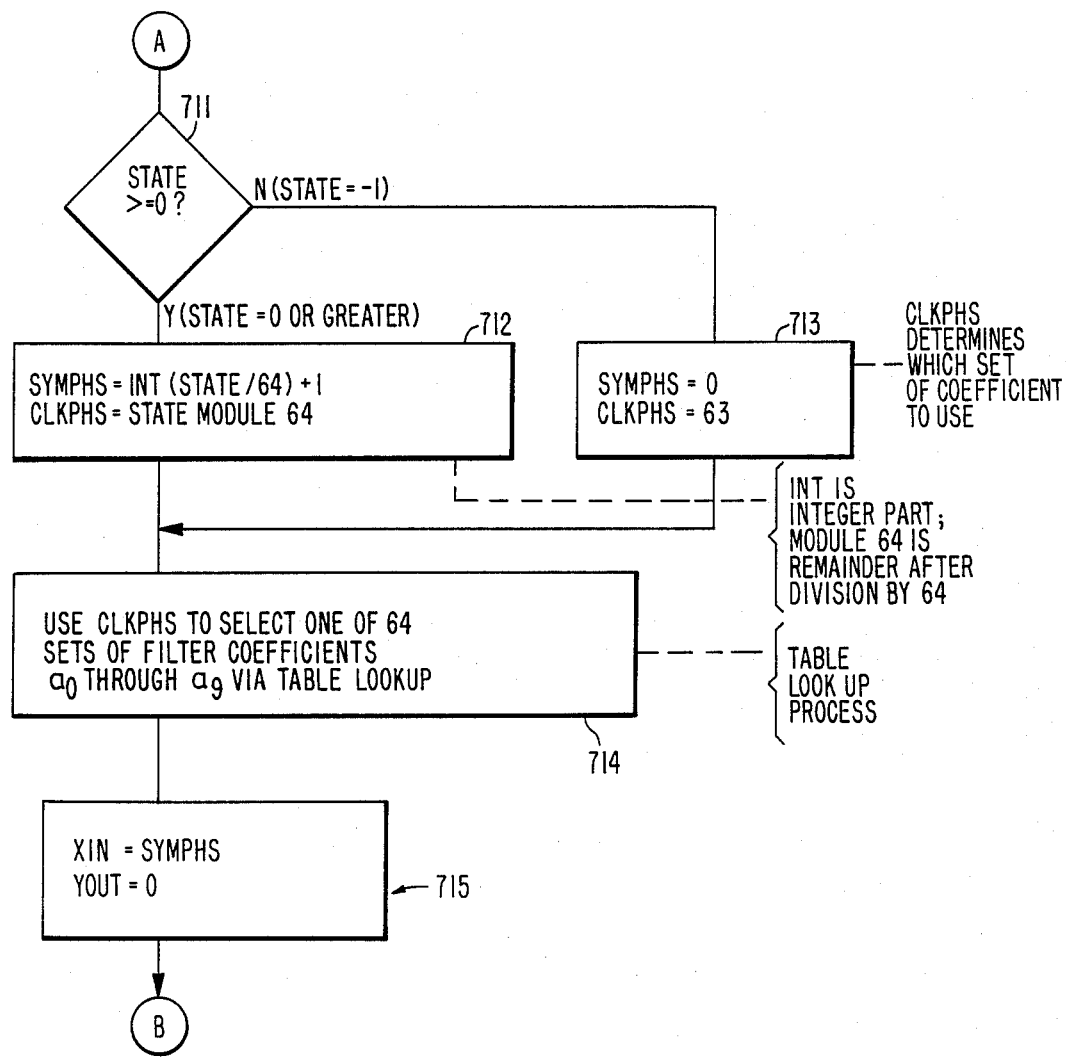
Figure 7C:
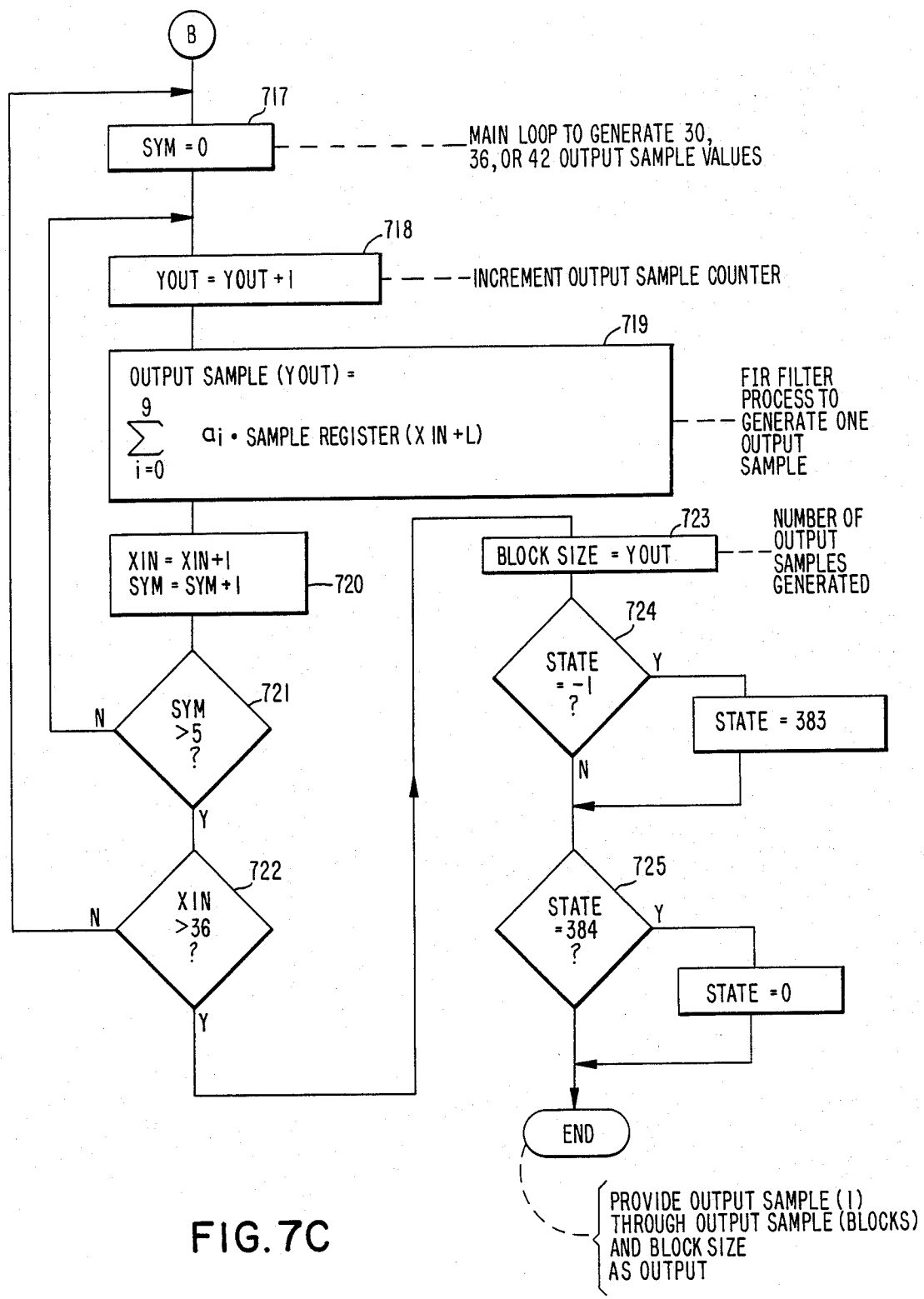

Also as indicated in the flow diagram, FIG. 7, the interpolator filter keeps track of the amount of delay it has applied to its input samples by use of a state variable, which is designed to contain one of 386 integer values ranging from −1 to 384, inclusive. When the interpolator filter increases or decreases its delay by 1/64 of one 7,200-HZ clock period, the interpolation filter increments or decrements the state of the variable. As illustrated in the flow diagram of FIG. 7, the interpolator filter generates 36 output samples for all state variable values except −1 and 384. For a state variable value of −1, the filter generates 42 output samples and changes the state variable value to 383; for a state variable value of 384, the filter generates 30 output samples and changes the state variable value to zero. The time average value of the block size which is nominally 36 samples will be locked to the baud rate at the far end terminal.

As indicated above, the purpose of the interpolation filter is to calculate what a receive sample value would be if the receive Codec 21 were to be strobed a fraction of a 7200 HZ clock cycle late. A constant amount of lateness (phase) is applied to all samples for a given block.

Referring to FIG. 4A, there is shown a typical example of an interpolation filter which operates according to this invention. The diagram of FIG. 4B describes a multi-order interpolation filter. As one can see from FIG. 4B, a curve is fit to contain the samples closest to the desired phase point and that is indicative of the interpolation filter operation. The value of the interpolated sample is the value of that point on the curve at the desired phase. To reduce computation load, the filter coefficients which represent the solutions to a phase-linear system are precomputed and placed in a Read Only table which is included within the interpolation filter module 25. The table is a Read Only memory which is accessed by the method indicated in the flow chart of FIG. 7. During the run time, the interpolation filter needs only to look up the appropriate set of filter coefficients by using the interpolator state value to calculate a table index. This value is determined by all previous values of the phase error from the baud sync measurement circuit 26.

Thus, as seen from FIG. 4A, the interpolating filter receives the 36 input samples and operates to multiply these samples by the filter coefficients which are indicated as input to multiplier modules 40, 41 and 42. As one can understand from the diagram of FIG. 4A, the interpolation filter is a relatively conventional design and operates to provide solutions to a phase-linear system. The coefficients a0, a1 and aN which are supplied to the multiplier modules 40, 41 and 42 are obtained from the memory lookup table as accessed by the phase error signal provided by the baud sync measurement module 26. The output of the various multipliers as indicated are summed in a summer 43 where they provide an output which is the retimed samples as directed to the baud sync measurement circuit 26. The operation of the interpolation filter circuit is described in detail in the flow charts of FIG. 7.

Figure 10:
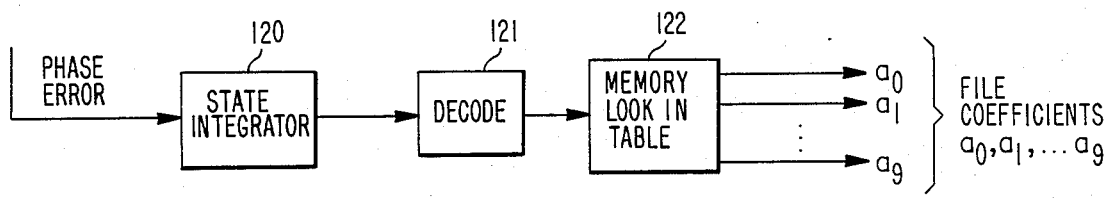
FIG. 10 is a block diagram depicting the selection of filter coefficients from the phase error signal developed by the baud sync measurement circuit.

Referring to FIG. 7, there is shown the flow chart operation of the interpolator filter. As one can see from FIG. 4, the interpolator filter contains a plurality of registers each designated as $Z^{-1}$. As shown in the flow chart, these registers are all set to zero via the procedure indicated by module 702. The system also acknowledges that the interpolator filter has been accessed for the first time. After setting the registers to zero, module 705 indicates that the signal is moved by shifting thirty six registers to the left. This as indicated in module 706 places 36 samples of the input signal into the upper thirty six registers. The phase error, as indicated in module 707, is the phase error provided by the baud-sync-measurement circuit. Depending on the magnitude of the phase error as being greater than or less than zero and as indicated by modules 707 and 709, one employs the sign of the phase error to increment and decrement the internal state of the interpolator. As indicated by module 711, the interpolator then determines which set of coefficients it will use. As indicated, the set of coefficients for the interpolator are stored in the memory look-up table which table is accessed by the interpolator routine. This as shown in FIG. 10 is further explained.

In any event, the interpolator utilizes the phase error to perform a state integration then decodes the phase error and selects coefficients which are stored in memory look-up tables. This is indicated by modules 712, 713 and 714 as shown in the flow diagram of FIG. 7. After selecting such coefficients, the interpolator then generates 30, 36 or 42 output sample values whereby the output-sample counter is then incremented as indicated by module 718. The filter operates to process and to generate one output sample as indicated by module 719. It then proceeds to generate a sufficient number of baud-output samples indicative of the block size as indicated by module 723. Thus, the interpolation filter provides the output sample through the output sample block size and also provides the block size as an output. This is shown in FIG. 3 in module 25.

Figure 6:
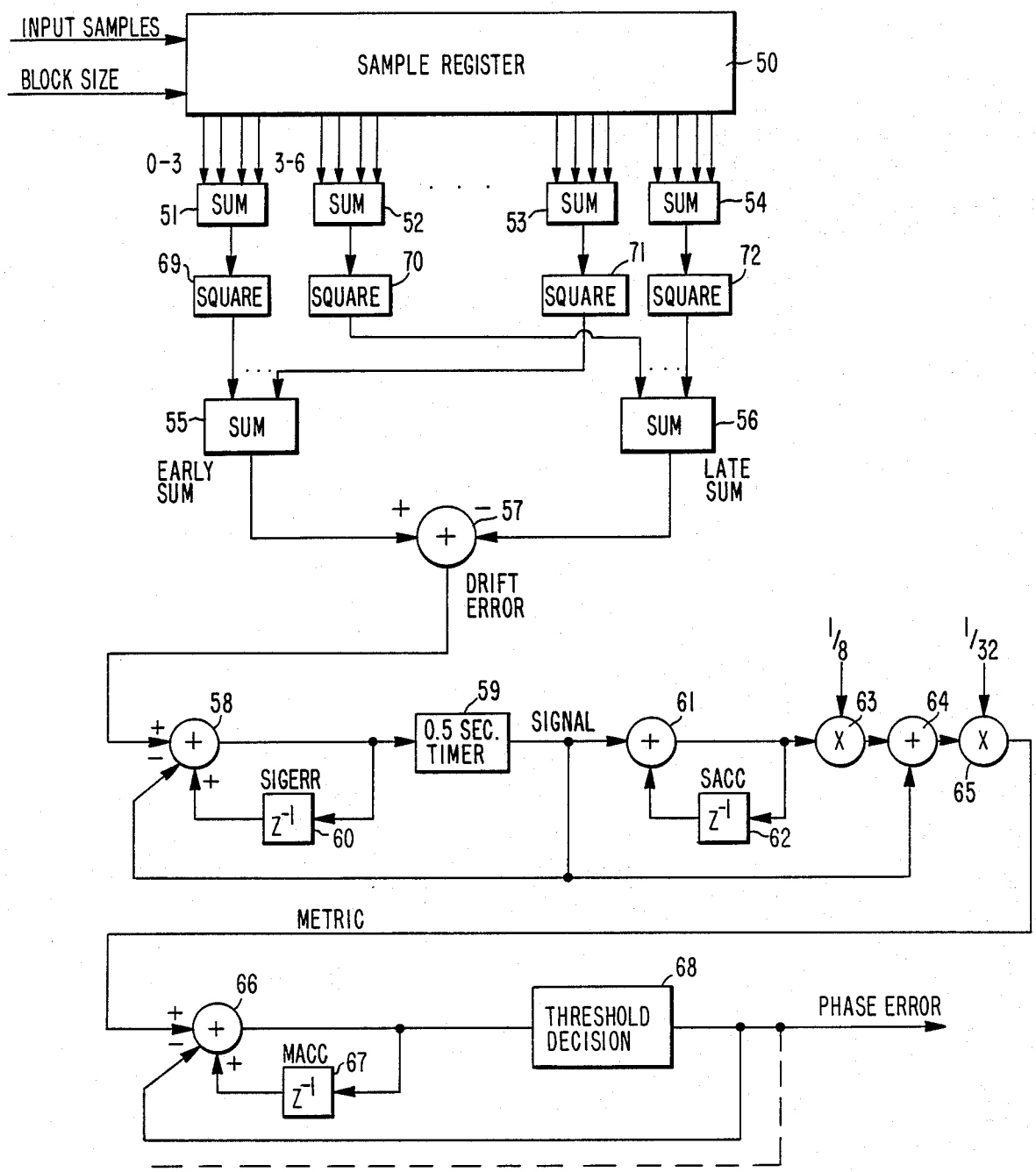
FIG. 6 is a block diagram of a baud sync measurement circuit according to this invention.

Referring to FIG. 6, there is shown a simple block diagram of the baud sync measurement circuit 26. The baud-sync measurement circuit 26 contains a sample register which operates in conjunction with a plurality of summers, squarers, timers, integrators, and comparators to produce a phase error as output. Essentially, the phase error is an indication of the residual timing error that has not been corrected. The baud-sync-measurement circuit includes a sample register 50 which receives input samples and block size as also indicated in the block diagram of FIG. 3. The sample register has a plurality of outputs which are coupled to the respective summers as 51, 52, 53 and 54. The outputs of the summer are squared by means of the squarer circuits 69, 70, 71 and 72. The output of squarer circuit 69 goes to an input of output summer 55 having as another input the output of squarer circuit 71. In a similar manner, the output of squarer circuit 72 serves as an input to summer 56 which summer has another input received from the output of squarer circuit 70.

Essentially, the summer 55 produces a signal indicative of an early sum while the output of summer 56 produces a signal indicative of a late sum. The terms "early" and "late" sum are indicative of the phase delay between measured samples as shown for example in FIG. 5. The early summer 51 provides the sum of four consecutive samples as for example 0-3 while the summer 52 provides the sum of four consecutive samples 3-6 and so on for each summer until all samples have been summed. Thus, all the sums of "early" summers as 0-3, 6-9 . . . etc. are summed in summer 55 and all sums of later samples as 3-6, 9-12 . . . etc. are summed in summer 56 after sampling. Thus, the output of the summer 57 produces a drift error. This drift error signal is applied to one input of a summer 58 which receives another input through a register 60 designated as SIGERR. The register 60 as shown in the flow chart is a holding register and provides a delay equal to 5 milliseconds. The output from the summer 58 is applied through a time delay 59 which provides a delayed output signal which signal is applied to the −input of the summer 58. The same signal is applied as an input to summer 61 which receives a delayed input from a delay register SACC which is a signal accumulator register. The output from the adder 61 is applied to a divide by eight 63 whose output is applied to a summer 64 at one input. The other input to summer 64 is the signal output from the 0.5 second timer 59. The output of summer 64 is applied to the input of a divide by thirty-two or multiply by one/thirty-two 65 whose output is applied to one input of a 3-input adder circuit 66.

Another input to the adder 66 is obtained through a delay register 67 designated as MACC which is metric accumulation register. The output of that register is applied to one input of the adder 66, as indicated. Another input from the adder 66 is obtained from the output of a threshold decision module 68. The input of the threshold decision module 68 is supplied from the output of the adder 66.

The threshold decision module 68 produces a signal indicative of the phase error. This signal is either +1, −1, or zero, as will be further explained.

Figure 8B:
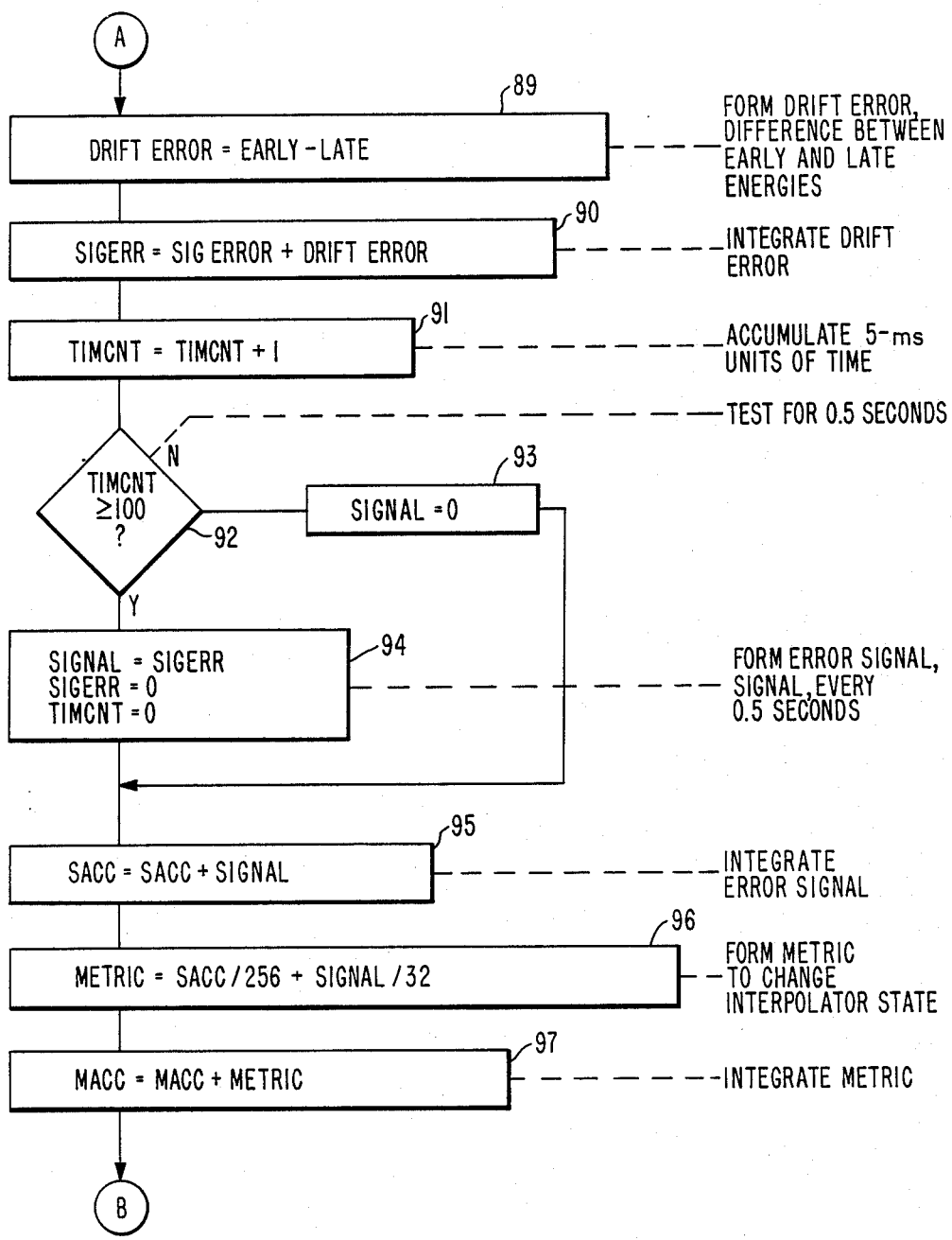
Figure 8C:
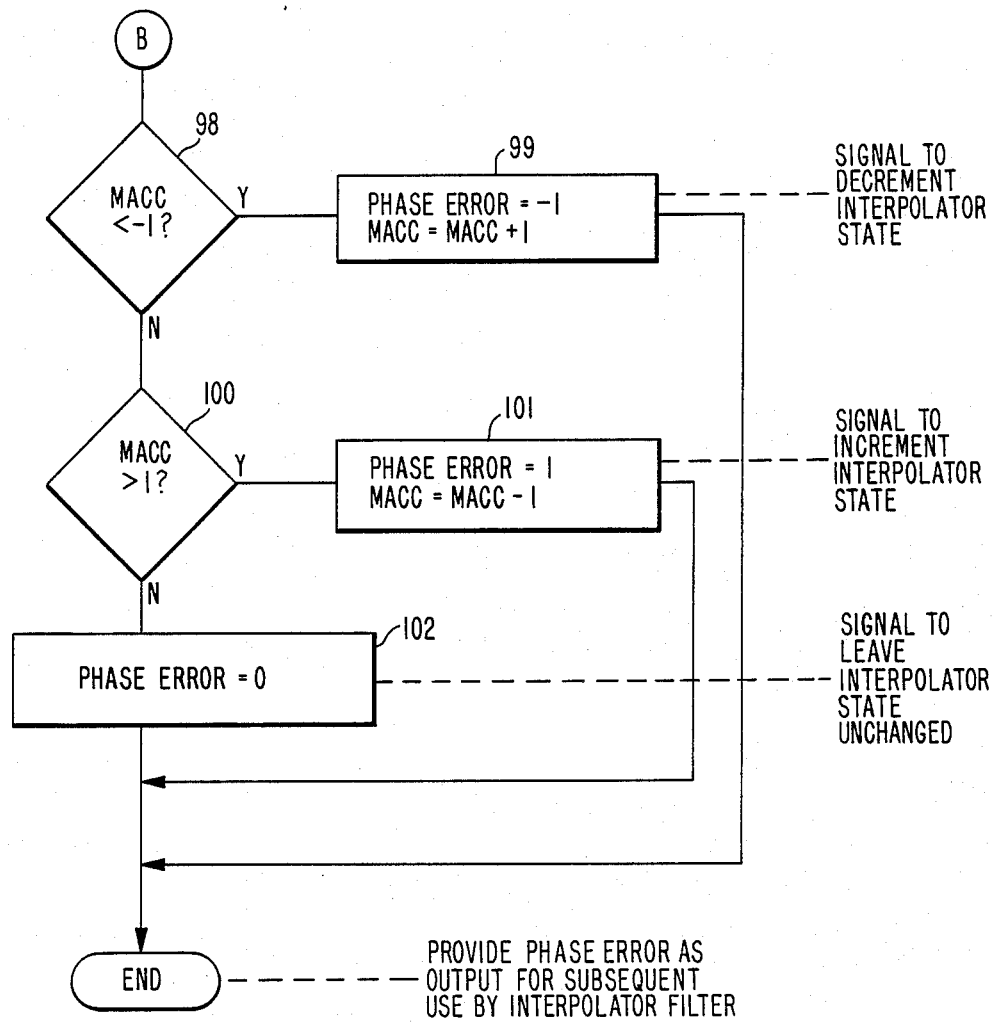

Referring to FIG. 8, there is shown in detail the baud-sync-measurement circuit operation. The circuit operation is shown in terms of a flow chart. Essentially, at the start which is designated by module 80, the system determines whether this was the first time the measurement has been executed. This is indicted by module 81. If it was the first time then the registers as the MACC register, the SACC register, the SIGERR register and the TIMCNT (timer of 59 of FIG. 6) are set to zero. Module 83 indicates that one now resets the first time executed indicator. In any event, this means that the program will continue as indicated. Module 84 indicates that the early, late and start outputs are set to 0, 0, 1 respectively. In modules 85 and 86 one accumulates the early window energies as well as the late window energies for the present six-sample symbol. This six-sample symbol is stored in a register. The apparatus via module 87 then determines the start of the next six-sample symbol and accumulates energies for all six-sample symbols within a block as indicated by module 88. If all energy has been accumulated within a block as indicated by module 88, one now goes to module 89 to calculate the drift error which is the difference between the early and late signal energies. The output goes to module 90 where the drift error is integrated. Module 91 indicates that one accumulates 5 milliseconds units of time after integrating the drift error. This 5 milliseconds is one data frame. The timer counter which is timer 59 is tested to see whether it has counted to 500 milliseconds. If it has then the signal is set equal to the error signal, the register SIGERR is set to zero and the TIMCNT is set to zero. From module 94 one enters module 95 where the error signal is integrated. In module 96 a metric is formed which is operative to change the interpolator state. Module 97 indicates that the metric is integrated. The output of the integrated metric now determines the phase error which is basically the threshold decision circuit 68. Hence, the threshold detector looks to see whether the contents of the MACC register is less than −1 or greater than 1. If its is not greater than either then the phase error is set to equal zero and the output phase error is provided for subsequent use by the interpolator filter as will be further explained by referring to FIG.

In FIG. 10 there is shown a simple block diagram where the phase error as developed by the above-noted circuitry or at the output of the threshold decision detector 68 of FIG. 6 is applied to a state integrator 120. The output of the state integrator 120 is applied to the decode circuit 121 whose output accesses a memory look-up table 122 to provide the various filter coefficients for the interpolating filter. The state integrator 120 takes the phase error as described above and adds this error to the interpolator state in order to decode all phase errors via decoder 121 and to access the memory look-up table 122. Essentially, this function is performed by the interpolation filter as the operation performed by modules 707 and 709 of FIG. 7. The look-up memory is indicated in FIG. 7 and accessed via modules 711–715.

FIG. 5 shows a typical sampled waveform where the squares stand for the sampled waveform points and the circles stand for the retimed or interpolated waveform points. This signal as indicated is sampled and produces a cumulative phase error between the sampled waveform and the interpolated waveform as shown.

The summers in FIG. 6 are shown by way of example and it is understood from FIG. 6 that there are additional summers operative to sum all desired samples in a 5 millisecond frame period. Thus, as one can understand from the above description an average traffic of 2,400 bits per second occurs between the modem and the data set. This is achieved by providing a burst of nominally 123,600 HZ clocks in a 5 millisecond time interval as shown in FIG. 2C. The actual number is 12 for the internal modem TX and either 11, 12, or 13 for the internal modem RX. The 12 clocks at 3.6 KHZ per 5 millisecond is equivalent to a traffic rate of 2,400 bps. The provision for 11 or 13 clocks during any given 5 millisecond interval allows the modem subsystem which generates the clocks to lock to the transmitting clock of the far end terminal.

Once per 5 millisecond block time in the receive path, the block labeled block-to-serial conversion 28 determines the number of dibits 6±1 which were demodulated. These are converted to 12±2 bits which accumulate in an internal buffer within the block-to-serial conversion module 28. If the internal buffer is relatively light, moderate or heavy with data then either 11, 12, or 13 bits respectively are expelled on an FIFO basis from an internal buffer at a 3,600 HZ burst rate during the next 5 millisecond block time.

It is also indicated that based on the above description, many of the routines basically described can be implemented by programs which control a typical processor circuit which is inherently included in most modems as shown for example in FIG. 3. It will be immediately ascertained that based on the timing diagrams of FIG. 2, that one can transmit the burst signal to a data set and depending upon the number of data signals detected can assure synchronization of the receiving modem with the far end transmitting modem.

Thus, as one can see and ascertain from the above description, the system herein relies on the transmittal of burst data during a fixed 5 millisecond period. The burst data is followed by a burst gap which data and gap are always equal to 18 samples of the 7.2 KH clock. In this manner, the number of data or clock pulses can be transmitted as 11, 12 or 13 resulting in a burst gap of 7, 6 or 5. This enables synchronization of the receiving modem to the transmitting modem and allows correct operation of the data subsets.

As far as the data set is concerned, based on the selection of the burst signal at the frequency of 3.6 KHZ, the data set receives an average data transmission of 2,400 bps and Operates synchronously due to the above described technique.

Thus, it is understood that one need not synchronize the sampling clock of the receiver to the sampling clock of the transmitter as accomplished in prior art systems as in this system one automatically receives synchronized data due to the burst frequency technique.

We claim:

1. Apparatus for locking a receiving modem to a remote transmitting modem, said receiving modem communicating with said transmitting modem over a communications channel of a given bandwidth for accommodating a given data rate with said transmitting modem providing an analog signal for transmission, which signal is generated by said transmitting modem using a clock for sampling digital data from a data set and converting said data according to said clock into an analog signal, comprising:
    receiving means for receiving said analog signal and for converting said signal to a digital signal,
    an interpolation filter means responsive to said digital signal for providing a retimed digital output signal, said interpolation filter means having coefficient input means to enable said retimed signal to vary according to selected coefficients,
    means coupled to the output of said interpolation filter means and responsive to said retimed signal to provide an error signal at an output indicative of differences in positions of said transmitted analog signal and said retimed signal,
    means for applying said error signal to said coefficient input means for varying said retimed signal according to said error signal to lock said retimed signal to said transmitted analog signal.

2. The apparatus according to claim 1, further including:
    demodulation means coupled to the output of said interpolation filter means for demodulating said retimed signal according to a given number of samples indicative of a given number of dibits per frame, and
    means coupled to said demodulation means for providing a burst data signal at one output and a burst clock signal at another output each having a first interval and a gap interval having no pulses, with the time of said gap and pulse interval being equal for all outputs, but with the number of pulses being different according to said retimed signal to enable a data set to synchronize to said burst signals for reproducing said transmitted data.

3. The apparatus according to claim 1, wherein said given data rate is 2,400 bps with said burst frequency selected at 3,600 HZ with said series of pulses in said first interval being 11, 12, 13 pulses specifying a gap interval respectively of 7, 6 or 5 for a 5 millisecond block, with said time of said gap and pulse interval always equal to a time of 18 clocks at said 3,600 HZ rate.

4. The apparatus according to claim 1, wherein said interpolation filter includes a digital FIR filter.

5. The apparatus according to claim 1, wherein said means for applying said error signal to said coefficient inputs means includes a lookup table having stored therein a plurality of coefficients for said interpolation filter with separate sets of said coefficients selected according to the magnitudes of said error signals.

6. The apparatus according to claim 5, wherein said look up table is a ROM.

7. The apparatus according to claim 1, wherein said communications channel is a telephone line.

8. The apparatus according to claim 1, wherein said receiving means includes a receiving Codec operative to sample said analog signal at a given sampling rate which rate is provided by a clock at said receiving means which clock is not synchronized to said transmitting clock.

9. The apparatus according to claim 8, wherein said sampling rate is 7.2 KHZ for a data rate of 2,400 bps.

10. Apparatus for locking a receiving modem to a remote transmitting modem said receiving modem communicating with said transmitting modem over a communications channel of a given bandwidth for accommodating a given data rate with said transmitting modem providing an analog output signal for transmission, which signal is generated by said transmitting modem using a clock for sampling digital data from a data set and converting said data according to said clock into said analog output signal for transmission over said communications channel, said apparatus, comprising:
   receiving means for receiving said analog output signal and for converting said signal to a digital signal,
   an interpolation filter means responsive to said digital signal for retiming said signal and for providing a retimed digital signal at an output with said signal retimed according to a control signal applied to a coefficient control input means associated with said interpolation filter means,
   a baud sync measurement means coupled to said output of said interpolation filter means and responsive to said retimed signal to provide an error signal at an output indicative of differences in symbol positions of said retimed signal, with said error signal output coupled to said coefficient control means of said interpolation filter means and means coupled to the output of said interpolation filter means for providing a burst data signal and a burst clock signal each having a series of pulses at a given frequency within a first interval followed by a gap of another interval with said series of pulses for said data and said clock being of a number according to said retimed signal output from said interpolation filter means and where said first interval and said gap interval is selected according to said given data rate, and
   a receive data set coupled to said conversion means and responsive to said burst clock and data signals to provide at an output a received replica of said digital data as generated by said transmitting modem.

11. The apparatus according to claim 10, wherein said receiving means includes a receiving codec operative to sample said received analog signal at a given sampling rate which rate is provided by a clock at said receiving modem which clock is not synchronized to said transmitting modem's sampling clock.

12. The apparatus according to claim 10, wherein said interpolation filter means is an FIR filter.

13. The apparatus according to claim 10, wherein said given data rate is 2,400 bps.

14. The apparatus according to claim 10, wherein said burst interval and said gap interval is equal to 5 milliseconds with said burst pulse frequency selected at 3.6 KHZ.

15. The apparatus according to claim 10, wherein said conversion means further includes a demodulator having an input coupled to the output of said interpolation filter means with the output of said demodulator coupled to the input of a block-to-serial converter for generating said burst clock and burst data signals.

16. The apparatus according to claim 10, wherein said communications channel is a telephone line.

17. A method of locking a receiving modem to a transmitting modem, said transmitting modem communicating with said receiving modem over a communications channel of a given bandwidth for accommodating a given data rate, with said transmitting modem providing an analog output signal which signal is generated by said transmitting modem using a sampling clock for sampling digital data from a data set and converting said data according to said clock into said analog output signal for transmission over said communications channel, comprising the steps of:
   receiving said transmitted analog signal and converting the same to a digital signal,
   digitally filtering said digital signal to provide an output retimed digital signal,
   detecting baud transitions in said output retimed digital signal with respect to symbol positions of said signal to provide a phase error signal indicative of a signed positional difference between said retimed digital signal and said symbol positions,
   applying said phase error signal to said digital filter to cause said filter to provide said output retimed digital signal,
   digitally filtering said retimed digital signal to provide a demodulated bit output,
   providing a burst data signal of a length varying according to size of said demodulated bit output and of bit rate matching the input bit rate of said transmitting modem, and,
   providing a burst clock signal according to said length, with said burst data and clock signals indicative of said given data rate over a given time period.

18. The method according to claim 17, wherein said given data rate is 2,400 bps with said burst data frequency being 3.6 KHZ for a 5 millisecond time period.

19. The method according to claim 17, wherein the step of digitally filtering includes digitally filtering said digital signal with a FIR interpolation filter.

20. The method according to claim 17, further including the step of monitoring said phase error to determine whether said value is less than zero or greater than zero, and incrementing or decrementing a state variable, if said phase error is non-zero.

21. The method according to claim 17, further including the step of utilizing said state variable to select a set of filter coefficients for said interpolation filter.

22. The method according to claim 17, further including the step of utilizing said variable to determine the size of a set of retimed samples output from said interpolation filter.

23. The method according to claim 21, further including the step of counting the number of additions made to said state variable and resetting said state variable when said number exceeds a given value.

24. The method according to claim 22, further including the step of counting the number of additions made to said state variable and resetting said state variable when said state variable is less than a given value.

* * * * *